United States Patent [19]

Zimmermann

[11] 3,748,228

[45] July 24, 1973

[54] NUCLEAR POWER STATION FOR A GASEOUS WORKING MEDIUM

[75] Inventor: Ulrich Zimmermann, Winterthur, Switzerland

[73] Assignee: Sulzer Brothers, Ltd., Winterthur, Switzerland

[22] Filed: May 6, 1969

[21] Appl. No.: 822,220

[30] Foreign Application Priority Data
May 17, 1968 Switzerland.................... 7370/68

[52] U.S. Cl..................... 176/60, 176/65, 176/87
[51] Int. Cl............................................ G21c 19/28
[58] Field of Search ................. 176/59, 40, 60, 87, 176/53, 55, 57, 65, 58

[56] References Cited
UNITED STATES PATENTS

| | | | |
|---|---|---|---|
| 3,175,953 | 3/1965 | Nettel et al............................ | 176/60 |
| 3,178,354 | 4/1965 | Vann et al........................ | 176/37 X |
| 3,371,017 | 2/1968 | Coast et al........................... | 176/87 |
| 2,277,800 | 4/1968 | Spillmann........................ | 176/60 X |
| 3,425,907 | 2/1969 | Bonsel et al...................... | 176/50 X |
| 3,444,038 | 5/1969 | Schabert........................... | 176/65 X |

FOREIGN PATENTS OR APPLICATIONS

| | | |
|---|---|---|
| 799,212 | 8/1958 | Great Britain |
| 6,606,033 | 11/1966 | Netherlands |

OTHER PUBLICATIONS

Berman, Paul A., Westinghouse Engineer, Sept. 1960, pp. 146–149.

*Primary Examiner*—Carl D. Quarforth
*Assistant Examiner*—E. E. Lehmann
*Attorney*—Kenyon and Kenyon Reilly Carr & Chapin

[57] ABSTRACT

The nuclear power station is constructed so that a working gas is conducted through a closed cycle. The reactor, power station and heat exchangers are accommodated in a pressure tight vessel while the starting point and end point of the working gas thermal work path are disposed in a sub-chamber with the power station.

16 Claims, 7 Drawing Figures

PATENTED JUL 24 1973 3,748,228

Inventor:
ULRICH ZIMMERMANN
BY
Kenyon & Kenyon
ATTORNEYS

NUCLEAR POWER STATION FOR A GASEOUS WORKING MEDIUM

This invention relates to a nuclear power station and more particularly to a nuclear power station comprising a nuclear reactor for heating a working gas used to operate a power station.

Official regulations by numerous countries contain safety regulations concerning the flow of working media and the construction and accommodation of machinery in nuclear power stations in order to prevent any escape of contaminated working media in the event of any damage to the plant. If the working medium is a vapor, simple steps are sufficient to comply with these regulations. For example, a construction has been evolved in which a steam generator is accommodated in a reactor pressure vessel and the heat produced by the reactor is carried out of the reactor to the steam generator heating surfaces by means of a recycled heat vehicle gas. In this construction, neither the water nor the steam can come into contact with a contaminated medium so that the entire steam power plant can be erected outside the reactor vessel.

However, conditions are quite different in nuclear power stations operated with gaseous working media. For example, since the gases used for the thermal work process have had a lower specific heat and lower coefficients of heat transfer than evaporable working media, the working gases have required large volumes for such stations. These large volumes have been such that the only constructions evolved heretofore have been those in which the reactor has been accommodated in a hermetically sealable machine room, with the intent of preventing any further danger by sealing off the entire machine room after the operating personnel have escaped, in the event of any accident occurring. Despite the outlay required, a precaution of this type has not been fully satisfactory because it has not been fully operative immediately upon the occurrence of an accident.

Accordingly, it is an object of the invention to practically completely protect the space outside a pressure vessel of a nuclear reactor plant utilizing a gaseous working medium.

It is another object of the invention to practically fully utilize the interior of a nuclear reactor vessel.

It is another object of the invention to reduce flow resistance to a gaseous working medium at points of high specific volume.

It is another object of the invention to reduce the number of openings through a reactor pressure vessel to the outside.

It is another object of the invention to obtain a minimum quantity of working medium within a nuclear power station.

It is another object of the invention to reduce piping to an absolute minimum within a nuclear power station.

Briefly, the invention provides a nuclear power station in which a nuclear reactor, the components of a power plant and heat exchangers for a gaseous working medium are accommodated in a pressure tight concrete vessel. In addition, the nuclear reactor is disposed in one sub-chamber of the vessel while the power plant and heat exchangers are disposed in another sub-chamber. Also, in order to carry the working gas from a starting point of the thermal work path to the end point thereof, the components of the power plant are at least partly successively interconnected by tubular ducts and the starting point and the end point of the work path are disposed in the sub-chamber surrounding the power plant components so that the working gas flows back from the end point through this sub-chamber to the starting point. The work cycle is thus a closed cycle.

Since the reactor, the power plant and the heat exchangers carrying the working gas, and the ducts and chamber parts required to form the cycle are accommodated in the pressure tight concrete vessel, only the mechanical or electrical power produced and the cooling water which does not come into contact with the contaminated gas have to be withdrawn from the concrete vessel. The space outside the concrete vessel is thus practically completely protected against contaminated gas while the interior of the reactor vessel is practically fully utilized. Further, reduction of the length of the piping and the increased flow cross-sections in the zone where the working gas has a high specific volume, greatly reduces losses due to flow resistances.

In one embodiment, the heat exchangers are disposed within the interior space of the sub-chamber containing the power plant whereas in a second embodiment, the heat exchangers are disposed in the walls of the sub-chamber in individual cell-like recesses. In either embodiment, the working medium flows at minimum pressure and approximately minimum temperature.

These and other objects and advantages of the invention will become more apparent from the following detailed description and appended claims taken in conjunction with the accompanying drawings in which:

Figure 1:
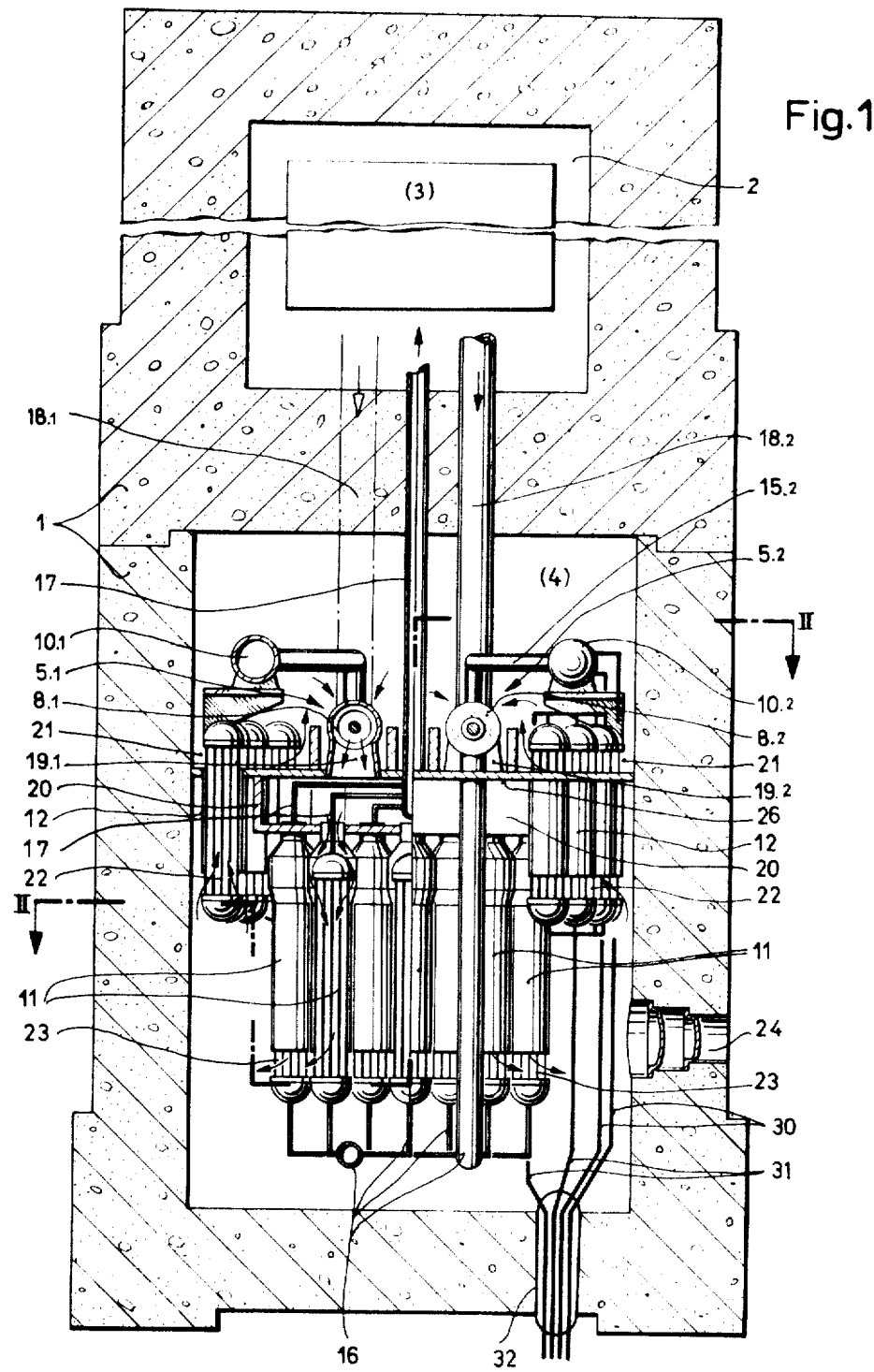
FIG. 1 illustrates a part cross-section view of a nuclear power station construction in accordance with the invention.
Figure 2:
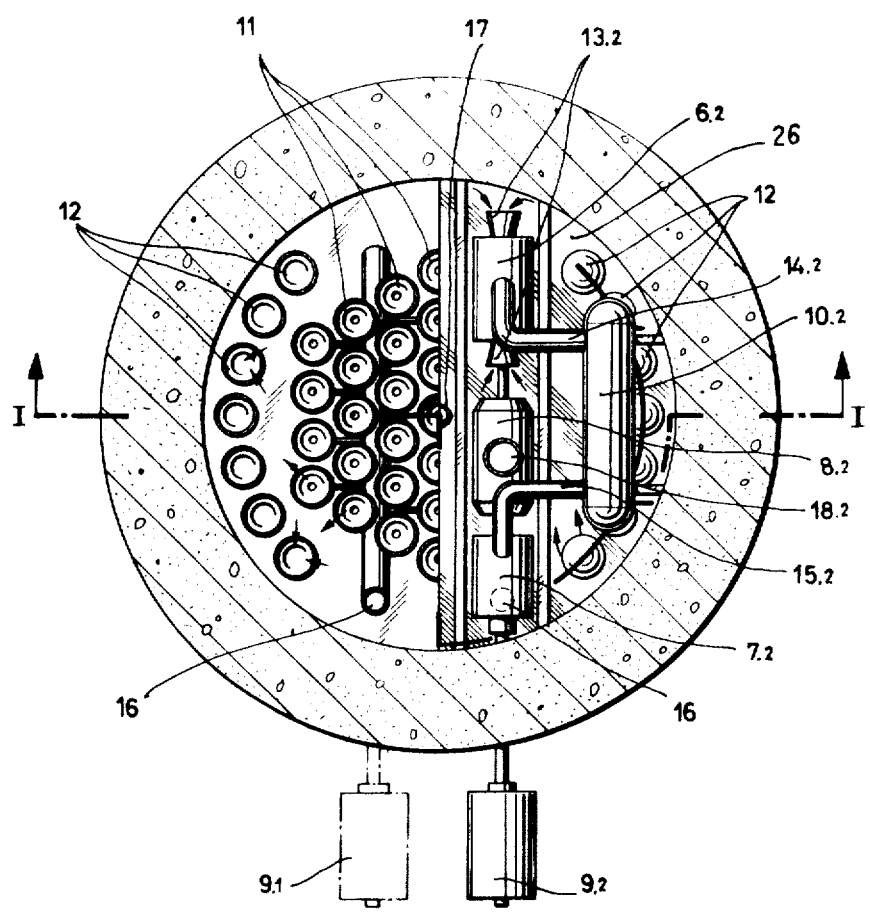
FIG. 2 illustrates a view taken on line 2—2 of FIG. 1.

Referring to FIGS. 1 and 2, the nuclear power station includes a casing in the form of a pressure tight and gas tight vessel 1 of reinforced concrete. The vessel 1 is subdivided into a pair of sub-chambers 2, 4 which may or may not be sealed off from one another by a partition since the vessel 1 forms an absolutely gas tight enclosure for the entire station. In addition, a nuclear reactor 3 is disposed in the upper sub-chamber 2 while a pair of power plants 5.1, 5.2 are located in the lower sub-chamber 4. The partition between the sub-chambers 2, 4 must withstand at least the pressure difference between the two chamber pressures and may be designed for higher pressure differences should such assume greater values, e.g. in the event of an accident.

Each power plant 5.1, 5.2 is constructed with identical sub-stations and therefore only the sub-station of one plant 5.2 is shown completely. Each sub-station includes a low pressure compressor 6.1, 6.2 which has a pair of oppositely disposed open feed pipes for drawing in working gas, a high pressure compressor 7.1, 7.2 and a gas turbine 8.1, 8.2, respectively which are mounted on a common shaft. Each common shaft is led out through the concrete vessel wall in gas tight and radiation proof manner to transmit a mechanical output to an electrical generator 9.1, 9.2 respectively.

The vessel 1 further encases heat exchangers for a flow of working gas therein. The heat exchangers provided inside the concrete vessel comprise intermediate coolers 10.1, 10.2 for cooling the working gas between the low pressure compressors 6.1, 6.2 amd high pressure compressors 7.1, 7.2 and a number of recuperators 11 which serve the two sub-stations jointly and re-coolers 12 which also serve both sub-stations jointly. Each low pressure compressor 6.1, 6.2 is connected to the intermediate cooler 10.1, 10.2 by a duct 14.1, 14.2 of tubular shape while ducts 15.1, 15.2 carry the gas from the intermediate coolers 10.1, 10.2 to the high pressure compressors 7.1, 7.2. A duct system 16 is connected to the two sub-station high pressure compressors 7.1, 7.2 to combine the working medium of the two halves and uniformly distribute the medium to a battery of recuperators 11 having suitable flow through tubes therein. The outlets from the recuperators 11 are also joined together by means of a duct system 17 leading to an inlet of the reactor 3.

Ducts 18.1, 18.2 are provided between the outlet of the reactor 3, as is known, to carry the working gas separately to each of the turbines 8.1, 8.2. The turbines 8.1, 8.2 are further connected via ducts 19.1, 19.2 to a distribution chamber 20 mounted from the floor 26 in order that the expanded working gas from the turbines 8.1, 8.2 can be distributed to the various recuperators 11 suspended from the chamber 20 to flow over the flow through tubes therein in counterflow to the flow in the tubes. The working gas can then flow, as indicated, from the recuperators 11 to the part of the chamber 4 situated beneath the intermediate floor 26 which supports the power plants 5.1, 5.2 and finally through the re-coolers 12 at the part of the chamber 4 above the intermediate floor 26.

It is apparent that the nuclear power station provides a working gas path which begins at the entry points 13.1, 13.2 of the low pressure compressors 6.1, 6.2 and terminates at the outlet 21 of the re-coolers 12. From the outlet 21 as far as the inlet 13, the working medium flows through the area surrounding the power plants 5.1, 5.2 at substantially minimum cycle temperature and minimum cycle pressure. At the same time, the speed of the working medium is reduced to a fraction so that, despite the large volume in this state of the gas, there is no appreciable pressure drop due to resistance to flow. In this way, it is also possible to dispense with ducting of very large cross-sections which would otherwise be very difficult to accommodate.

All points of the interior of the concrete vessel 1 have a pressure above atmospheric and equal at least to the minimum cycle pressure. Since the two parts of the chamber 4 which are interconnected by the re-coolers 12, however, have only an insignificant pressure difference due to the resistance to the flow of the gas in the re-coolers 12, this pressure difference would not be sufficient to bear the intermediate floor with the power plants. The floor 26 must therefore simply be dimensioned according to the weight of the power plant components that have to be supported.

An access 24 to the interior of the vessel 1 is provided; however, this access 24 must be kept sealed during operation so that any contaminated gas cannot escape from the interior even if an accident of some kind causes the entire gas contents to be distributed to the two sub-chambers 2, 4 until the pressure is completely equalized. In such a case, the pressure in the sub-chamber 4 would have to rise considerably while probably dropping in the sub-chamber 2.

In order to introduce and withdraw cooling water to and from the concrete vessel 1 for the intermediate coolers 10.1, 10.2 and re-coolers 12, pipes 30, 31 are respectively connected to each and are led out through the wall of the vessel 1 via a single sealing system 32.

Figure 3:
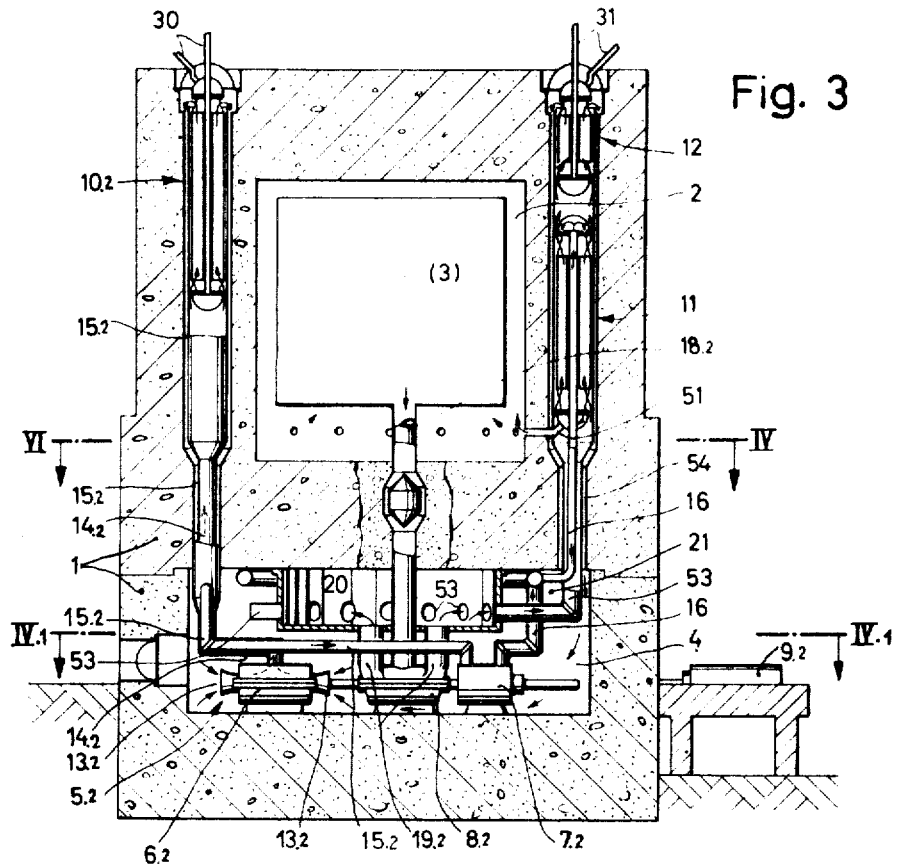
FIG. 3 illustrates a similar view as FIG. 1 of a modified nuclear power station according to the invention.
Figure 4:
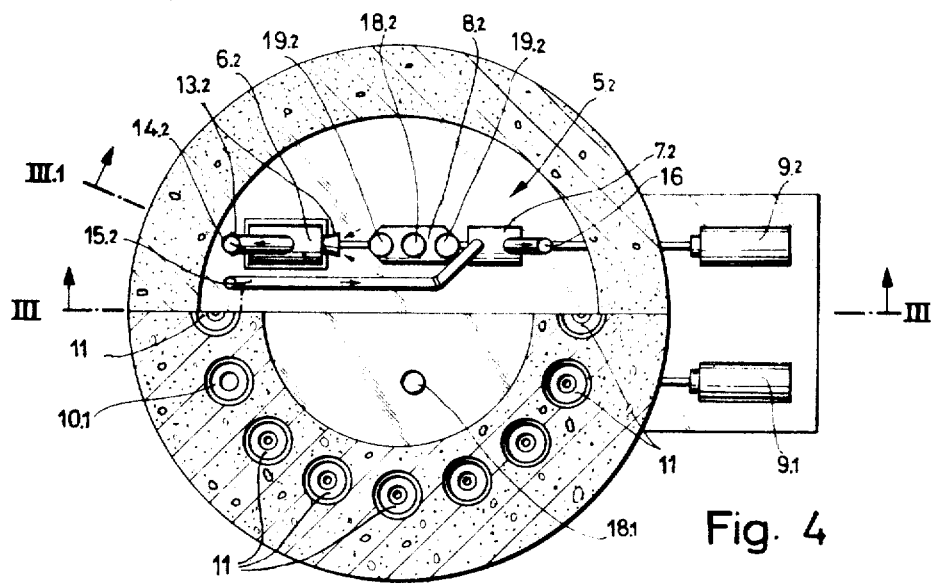
FIG. 4 illustrates a view taken on line 4—4 of FIG. 3.

Referring to FIGS. 3 and 4, wherein like parts as above are designed with like reference characters, the nuclear reactor station can be modified so that the heat exchangers 10, 11, 12 are disposed around the reactor 3 in individual cell-like recesses in the wall of the vessel 1. As above, the working path of the working gas again begins at an initial point 13.1, 13.2, passes through the low pressure compressors 6.1, 6.2 (only one of which is shown), and then passes through the ducts 14 to the intermediate coolers 10.1, 10.2 respectively.

Figure 5:
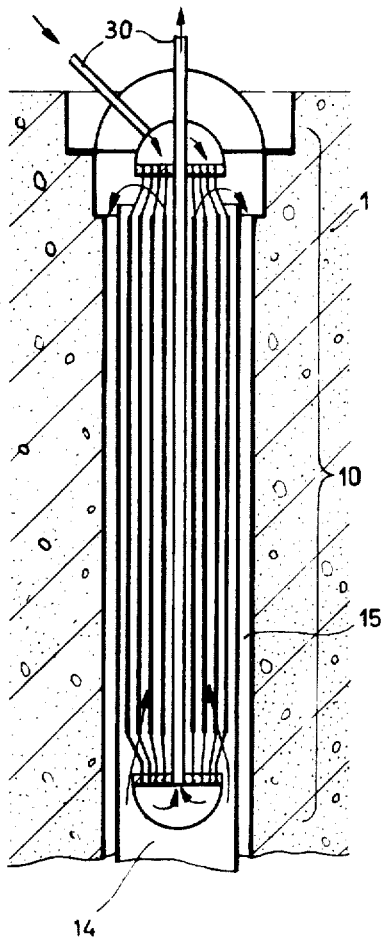
FIG. 5 illustrates an enlarged view of a heat exchanger of the station of FIG. 3.

Referring to FIGS. 3 and 5, in flowing through a cooler 10, the working gas flows upwardly in the duct 14 over suitable flow through tubes connected between lines 30 to a source of coolant, e.g. water, and to an outlet. Thereafter, the working gas passes downwardly over the exterior of the duct 14 within the duct 15 which may be concentrically disposed to the duct 14 and directed to the high pressure compressor (not shown). The working medium then flows back through the ducts 15 to the high pressure compressor 7.1, 7.2 and then through a duct system 16 which distributes the gas to the individual recuperators 11.

Figure 6:
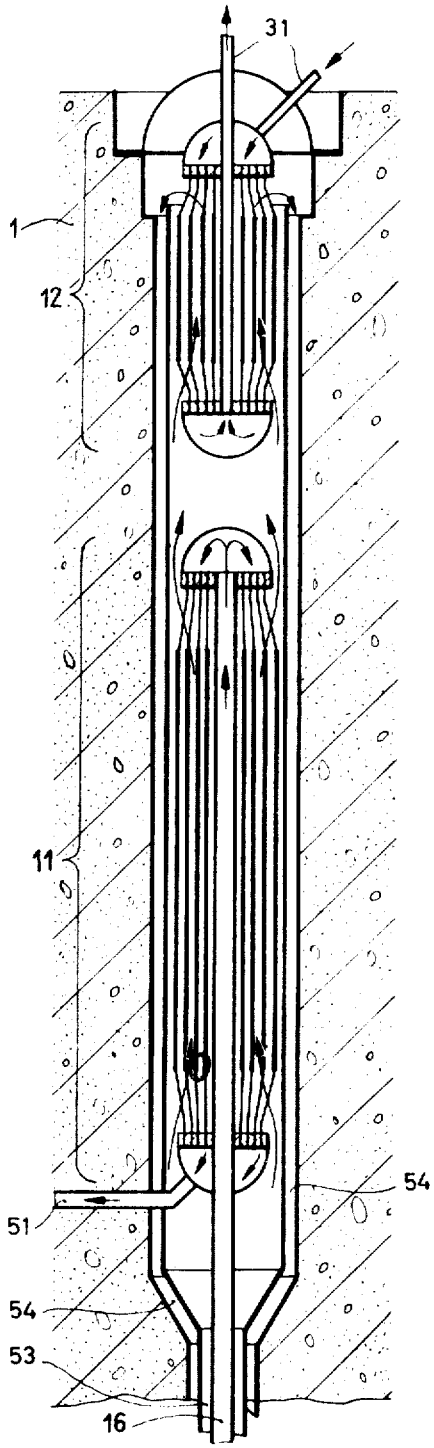
FIG. 6 illustrates an enlarged view of another heat exchanger of the station of FIG. 3.

Referring to FIGS. 3 and 6, in flowing through a recuperator 11, the cooled working gas flows up through a duct 16 at the center of the recuperator 11 and thence downwardly through a plurality of suitable flow through tubes connected between suitable manifolds at the two respective ends of the duct 16. The working gas then continues through individual pipes 51 to the sub-chamber of the nuclear reactor.

Referring to FIG. 6, the working gas then passes from the sub-chamber 2 through pipes 18.1, 18.2 to the turbines 8.1, 8.2 and via ducts 19.1, 19.2 to the distribution chamber 20 from which the path then continues through individual pipes 53 back to the recuperators 11 and on to the re-coolers 12.

Referring to FIGS. 3 and 6, in flowing back through a recuperator 11, the heated working gas enters via a pipe 53 and passes upwardly over the tubes (as shown) in counter flow and in heat exchange relation to the cooler working gas in the tubes. The working gas then continues upwardly over suitable flow through tubes in a re-cooler 12 connected between lines 31 to a source of coolant, e.g. water, and to an outlet. Thereafter, the working gas passes downwardly via an annular duct 54 which may be concentric to the duct 53.

Referring to FIG. 3, the working gas then passes from the annular ducts 54 in the vessel wall to the end point 21 in the sub-chamber 4. The gas passes at minimum pressure and approximately minimum temperature through the chamber surrounding the power plant components and finally passes back to the initial point 13, which completes its work cycle.

The nuclear reactor station of the first exemplified embodiment thus reduces the piping required to an absolute minimum to comply with the general principle of using the minimum size of machine room and hence the minimum pressure vessel volume. This has proved to be surprisingly successful by the provision of an intermediate floor in the chamber 4. Another advantage of this exemplified embodiment is the extremely simple geometric shape of the machine room, which results in an easily calculated and economically constructed pressure vessel. The simple shape of the machine room also provides important advantages with regard to the provision of any sheet-metal lining required for the room.

The nuclear reactor station of the second exemplified embodiment on the other hand, allows the heat exchangers to be readily removable and functions on a minimum quantity of working medium. In addition, this latter embodiment enables the reactor station to be constructed below ground even when there is a relatively high ground water level and where a minimum overall height is necessary. For example, the nuclear power station can be constructed in accordance with the power plant described in U.S. patent application, Ser. No. 762,185, filed Sept. 16, 1968. This results in a surprisingly simple solution as regards space, and despite the relatively intensive fissuring of the concrete, enables a relatively simple structural shape to be used, which is easy to line.

Figure 7:
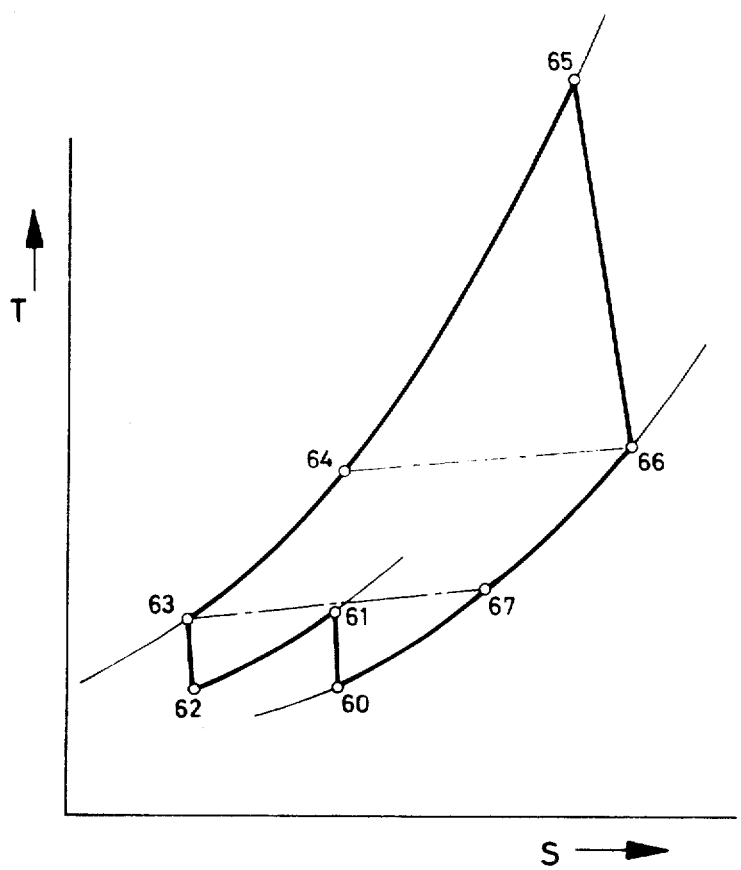
FIG. 7 graphically illustrates a temperature-entrophy cycle curve of the working medium in a nuclear power station constructed according to the invention.

Referring to FIG. 7, on a temperature-entropy T, S graph, the work cycle is represented substantially as a closed gas turbine process. At point 60 which corresponds to the starting point 13 and the end point 21, the working medium has its minimum temperature and minimum pressure and enters the low pressure compressor 6 in this state. The working medium is then cooled in the intermediate cooler 10 from state 61 to state 62, and then brought to a state 63 in the high pressure compressor 7 which is the maximum cycle pressure. The working medium then flows through the recuperators 11 as far as state 64 and is finally continued in the reactor 3 to the maximum temperature state at point 65. Subsequent expansion is the turbines 8 causes the working medium to be brought back to a lower pressure and lower temperature at state 66. The working gas then yields up heat to the state 67 in the recuperators 11, whereupon re-cooling to state 60 is carried out in the re-coolers 12. The heat withdrawn from the working gas between the states 66 and 67 is restored to it in the recuperators 11 between the states 63 and 64.

In both nuclear power stations described above, the working medium at state 60 is in that part of the chamber 4 which surrounds power plant components 6, 7, 8 and flows through this chamber from the end point 21 of the work path to the starting point 13 to complete the work cycle. Also, in both stations, the working medium flows at minimum pressure and approximately minimum temperature corresponding to state 60 through the chamber 4 upon passing back to the starting point 13 from the end point 21.

In the nuclear power station shown in FIGS. 1 and 2, the working medium also flows at state 67 between recuperators 11 and the re-coolers 12 freely in that part of the chamber 4 which is situated beneath the floor 26. The flow through the open chamber is very favorable in this case because the specific volume is very high as a result of the elevated temperature here.

The invention further provides a nuclear reactor station which is of simple construction and which increases safety while achieving a considerable saving in space and reducing power losses.

What is claimed is:

1. A nuclear power station comprising
a pressure vessel divided into at least a first chamber and a second chamber;
a nuclear reactor sealingly disposed in said first chamber for heating a working gas therein;
a power plant having a turbine and a compressor sealingly disposed in said second chamber, said turbine being disposed in said second chamber to receive the heated working gas from said reactor in said first chamber to produce a mechanical output; and
a plurality of heat exchangers disposed in said pressure vessel for cooling the heated working gas exhausted from said turbine, said heat exchangers being connected with said turbine and compressor of said power plant to convey the working gas therethrough from a starting point within said second chamber disposed adjacent said compressor, through said compressor, said reactor, said turbine and said heat exchangers to an end point within said second chamber, said end point being spaced from said starting point and opening into said second chamber, said working gas completely filling said second chamber and flowing from said end point into and through said second chamber about said turbine and said compressor of said power plant to said starting point.

2. A nuclear power station as set forth in claim 1 wherein said heat exchangers are disposed in said second chamber and wherein an intermediate floor is disposed in said second chamber to separate said second chamber into two parts.

3. A nuclear power station as set forth in claim 2 wherein a first part of said two parts contains said power plant and a second part contains at least some of said heat exchangers.

4. A nuclear power station as set forth in claim 3 wherein said heat exchangers include a plurality of re-coolers mounted in said intermediate floor at said end point.

5. A nuclear power station as set forth in claim 3 wherein said heat exchangers include a plurality of recuperators mounted in said second part for cooling a flow of the working gas and a plurality of re-coolers mounted in said intermediate floor at said end point and connected to said recuperators to further cool the flow of working gas passing from said recuperators to said power plant.

6. A nuclear power station as set forth in claim 5 wherein said recuperators each have an inlet projecting into said second part below said floor and an outlet projecting into said first part above said floor.

7. A nuclear power station as set forth in claim 5 which further comprises a distribution chamber mounted from said floor and connected between said power plant and said recuperators for distributing the working gas to said recuperators.

8. A nuclear power station as set forth in claim 7 wherein said recuperators are suspended from said distribution chamber.

9. A nuclear power station as set forth in claim 2 wherein said power plant is supported on said intermediate floor.

10. A nuclear power station as set forth in claim 1 wherein said power plant includes a low pressure compressor having at least one open feed pipe at said starting point for drawing working gas thereinto.

11. A nuclear power station as set forth in claim 10 wherein said power plant further includes a high pressure compressor connected to said low pressure compressor and said heat exchangers include a cooler connected between said low pressure compressor and said high pressure compressor for cooling a flow of working gas passing therebetween.

12. A nuclear power station as set forth in claim 11 wherein said compressors and said cooler are mounted in the second chamber.

13. A nuclear power station as set forth in claim 1 wherein said pressure vessel has a wall containing recesses therein, and wherein at least some of said heat exchangers are mounted in said recesses.

14. A nuclear power station as set forth in claim 13 wherein siad heat exchangers include a plurality of recuperators connected to said power plant and mounted in said recesses.

15. A nuclear power station as set forth in claim 13 wherein said heat exchangers include a plurality of recoolers at said end point mounted in said recesses.

16. A nuclear power station as set forth in claim 13 wherein said power plant includes a low pressure compressor at said starting point for drawing in working medium and a high pressure compressor connected to said low pressure compressor, and wherein said heat exchangers include coolers connected between said compressors and mounted in said recesses for cooling a flow of working gas passing between said compressors.

* * * * *